(12) United States Patent
Nguyen et al.

(10) Patent No.: US 8,842,930 B2
(45) Date of Patent: Sep. 23, 2014

(54) IMAGE PROCESSING DEVICE AND IMAGE PROCESSING METHOD

(75) Inventors: Khang Nguyen, Osaka (JP); Yusuke Monobe, Kyoto (JP)

(73) Assignee: Panasonic Corporation, Osaka (JP)

(*) Notice: Subject to any disclaimer, the term of this patent is extended or adjusted under 35 U.S.C. 154(b) by 24 days.

(21) Appl. No.: 13/704,791

(22) PCT Filed: Apr. 9, 2012

(86) PCT No.: PCT/JP2012/002469
§ 371 (c)(1),
(2), (4) Date: Dec. 17, 2012

(87) PCT Pub. No.: WO2012/144158
PCT Pub. Date: Oct. 26, 2012

(65) Prior Publication Data
US 2013/0089268 A1    Apr. 11, 2013

(30) Foreign Application Priority Data
Apr. 22, 2011 (JP) ................................ 2011-095743

(51) Int. Cl.
*G06K 9/40* (2006.01)
*G06T 5/00* (2006.01)
*H04N 5/21* (2006.01)
*H04N 1/409* (2006.01)
*H04N 5/208* (2006.01)

(52) U.S. Cl.
CPC ....... *G06T 5/002* (2013.01); *G06T 2207/20192* (2013.01); *H04N 5/21* (2013.01); *H04N 1/409* (2013.01); *G06T 5/004* (2013.01); *H04N 5/208* (2013.01)
USPC .......... 382/260; 382/254; 382/255; 382/264; 382/274

(58) Field of Classification Search
CPC ......... H04N 1/409; H04N 5/21; H04N 5/232; H04N 5/357; G06T 5/002; G06T 5/003
USPC ................. 382/254, 255, 260, 263, 264, 274; 348/241, 620
See application file for complete search history.

(56) References Cited

U.S. PATENT DOCUMENTS 6,724,943 B2   4/2004  Tsuchiya et al.
7,257,271 B2 * 8/2007  Adams et al. ................. 382/275
(Continued)

FOREIGN PATENT DOCUMENTS

JP    64-60065      3/1989
JP    2001-298621   10/2001
(Continued)

OTHER PUBLICATIONS

International Search Report issued May 22, 2012 in International (PCT) Application No. PCT/JP2012/002469.

*Primary Examiner* — Ali Bayat
(74) *Attorney, Agent, or Firm* — Wenderoth, Lind & Ponack, L.L.P.

(57) ABSTRACT

An image processing device includes: a first band limiting unit that reduces noise included in an input image; and a restoring unit, wherein the restoring unit has a difference calculating unit that calculates a difference between the input image and a noise-reduced image, a predicted noise obtaining unit that obtains a predicted noise amount to be included in the input image, a correction signal generating unit that generates a correction signal for correcting the noise-reduced image and controlling an absolute value of the difference between the input image and the noise-reduced image within a range of the predicted noise amount, and an image synthesizing unit that corrects the noise-reduced image based on the correction signal.

14 Claims, 10 Drawing Sheets

(56) References Cited

U.S. PATENT DOCUMENTS

| | | |
|---|---|---|
| 7,508,550 B2 | 3/2009 | Kameyama |
| 7,668,391 B2 | 2/2010 | Nonaka et al. |
| 8,035,871 B2 | 10/2011 | Kameyama |
| 2001/0038716 A1 | 11/2001 | Tsuchiya et al. |
| 2005/0280869 A1 | 12/2005 | Kameyama |
| 2007/0023657 A1* | 2/2007 | Takane et al. .............. 250/310 |
| 2007/0047832 A1 | 3/2007 | Nonaka et al. |
| 2009/0136152 A1 | 5/2009 | Kameyama |
| 2009/0273717 A1* | 11/2009 | Masaoka et al. ............ 348/620 |
| 2010/0157108 A1 | 6/2010 | Nonaka et al. |
| 2010/0157110 A1* | 6/2010 | Hatanaka et al. ............ 348/241 |
| 2010/0201828 A1* | 8/2010 | Mitsuya et al. ............ 348/208.6 |
| 2011/0043526 A1 | 2/2011 | Shiomi et al. |

FOREIGN PATENT DOCUMENTS

| | | |
|---|---|---|
| JP | 2005-310098 | 11/2005 |
| JP | 2006-4124 | 1/2006 |
| JP | 2007-60457 | 3/2007 |
| WO | 2009/130820 | 10/2009 |

\* cited by examiner

IMAGE PROCESSING DEVICE AND IMAGE PROCESSING METHOD

TECHNICAL FIELD

The present invention relates to image processing devices and image processing methods. The present invention particularly relates to an image processing device and image processing method in which a blurred image is restored to generate a high-definition image.

BACKGROUND ART

Image restoration processing can reproduce a high-definition image from a blurred image. In the restoration processing, however, a high frequency component of the image is enhanced, and thus noise included in the image is also significantly amplified. For this reason, in order to obtain a well-restored image, a noise reduction processing with high precision is needed before the restoration processing is performed.

Usually, examples of the noise reduction processing include a processing using a low-pass filter. In this processing, the high frequency component of the image is limited to reduce noise. An edge component included in the high frequency component is also reduced, however. As a result, the edge of the image is undesirably blurred.

Contrary to this, in the related art, a technique of performing different noise reduction processings on a flat portion of an image and an edge portion of the image has been disclosed (for example, see PTL 1 and PTL 2).

CITATION LIST

Patent Literature

PTL 1: Japanese Unexamined Patent Application Publication No. 2007-60457
PTL 2: Japanese Unexamined Patent Application Publication No. 64-60065

SUMMARY OF INVENTION

Technical Problem

In the related art, however, it is difficult to perform the noise reduction processing on the edge portion included in the image. The present invention aims at solving the problem in the related art. An object of the present invention is to provide an image processing device that reduces noise well in the entire region of an image.

Solution to Problem

In order to solve the problem in the related art, one aspect of an image processing device according to the present invention is an image processing device including: a first band limiting unit that reduces noise included in an input image; and a restoring unit that performs a restoration processing on a noise-reduced image to restore image information other than the noise, the noise-reduced image being the input image subjected to a noise reduction processing in the first band limiting unit, and the image information being degraded by the performance of the noise reduction processing, wherein the restoring unit includes: a difference calculating unit that calculates a difference between the input image and the noise-reduced image; a predicted noise obtaining unit that obtains a predicted noise amount to be included in the input image; a correction signal generating unit that generates a correction signal for correcting the noise-reduced image and controlling an absolute value of the difference between the input image and the noise-reduced image within a range of the predicted noise amount; and an image synthesizing unit that corrects the noise-reduced image based on the correction signal.

The present invention can also be realized not only as such an image processing device, but also as an image processing method including the steps corresponding to components included in the image processing device, or a program for causing a computer to execute such steps. Moreover, such a program can be delivered as a recording medium such as a Compact Disc Read Only Memory (CD-ROM) and a transmission medium such as the Internet.

Further, the present invention can be realized as a semiconductor integrated circuit (LSI) that implements part or all of the functions of the image processing device, or an image processing system including such an image processing device.

Advantageous Effects of Invention

The present invention can provide an image processing device that can reduce noise well in the entire region of an image.

DESCRIPTION OF EMBODIMENTS

Embodiment 1

Knowledge Based on the Present Invention

Figure 1:
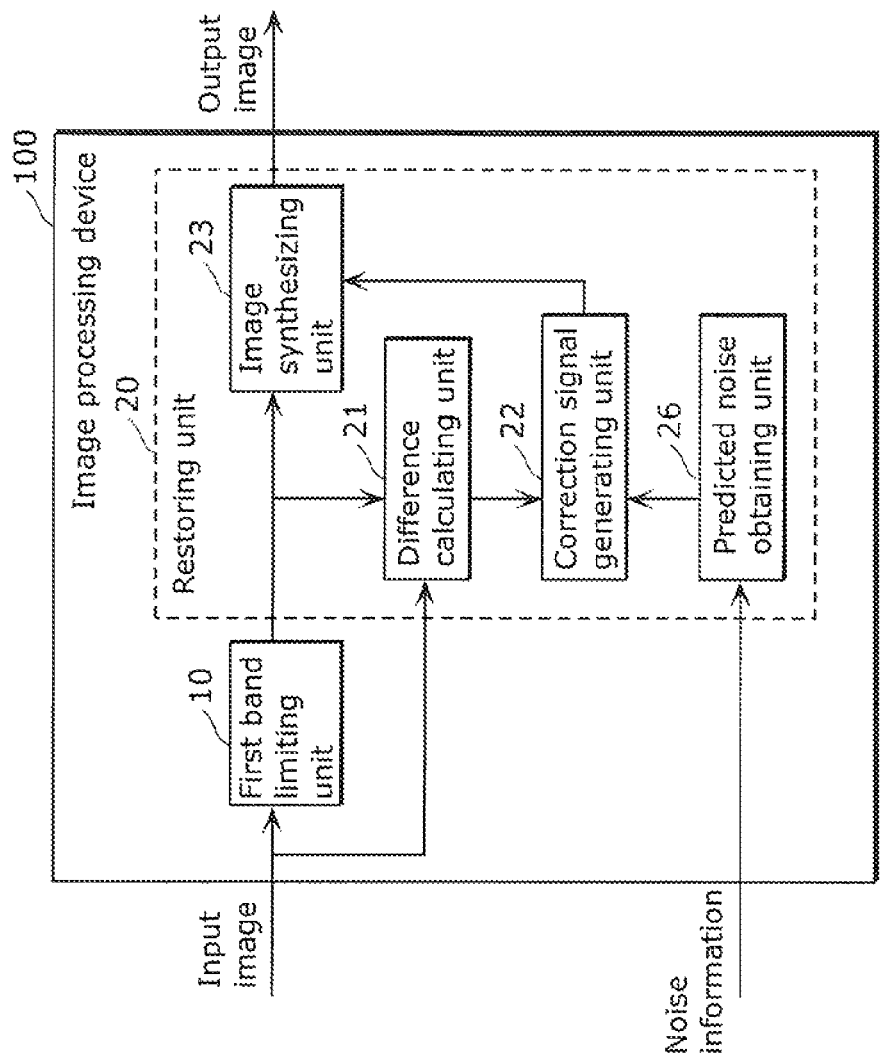
FIG. 1 is a block diagram showing an example of an image processing device according to Embodiment 1 of the present invention.

The present inventors found out that the noise reduction processing described in "Background" has the following problems.

In PTL 1, in order to improve resolution of an input image, control is performed in the edge portion; and thereby among the frequency components of the image included in the region, a larger amount of a high frequency component is distributed than the amount of other frequency component. The processing is a processing that enhances the high frequency component included in the edge portion. Accordingly, a large amount of noise together with the high frequency component exists in the edge portion in which the high frequency component is enhanced. For this reason, the noise remains in the edge portion.

Moreover, edge portion round waveform correction shown in PTL 2 uses a high-pass filter that enhances the high frequency component of the frequency components included in the image. Thereby, the high frequency component including noise is enhanced. The noise is subsequently canceled by a slicer. Only a fixed level of noise can be removed because change in the amount of noise according to luminance is not considered. Further, an edge component is enhanced by an amplifier, and the noise remaining in the vicinity of the edge is also enhanced.

Further, when the input image is subjected to the noise reduction processing and blur of the image is subjected to the restoration processing, the high frequency component is enhanced. In the noise reduction processing in the related art, noise remains in the edge portion, and the noise is significantly amplified in the edge portion by the restoration processing.

Namely, in the related art of the present invention, the edge region and other region included in the input image are subjected to different noise reduction processings. This aims at suppressing blur of the edge region, and performing the noise reduction processing.

As described above, however, the related art cannot completely reduce the noise included in the edge region.

In the image processing device according to the present invention, first, the entire region of the input image is subjected to the noise reduction processing stronger than that in the related art. Subsequently, a high frequency component excessively removed by the noise reduction processing is restored in each of pixels. Here, "excessiveness" is determined by referring a noise prediction model determined in advance and comparing a predicted noise amount corresponding to a luminance value of the input image with image information removed from the input image.

Specifically, one aspect of the image processing device according to the present invention is an image processing device including: a first band limiting unit that reduces noise included in an input image; and a restoring unit that performs a restoration processing on a noise-reduced image to restore image information other than the noise, the noise-reduced image being the input image subjected to a noise reduction processing in the first band limiting unit, and the image information being degraded by the performance of the noise reduction processing, wherein the restoring unit includes: a difference calculating unit that calculates a difference between the input image and the noise-reduced image; a predicted noise obtaining unit that obtains a predicted noise amount to be included in the input image; a correction signal generating unit that generates a correction signal for correcting the noise-reduced image and controlling an absolute value of the difference between the input image and the noise-reduced image within a range of the predicted noise amount; and an image synthesizing unit that corrects the noise-reduced image based on the correction signal.

Thereby, after the noise reduction processing is performed on the entire region of the input image, the pixel information in which the bandwidth is excessively limited in the noise reduction processing is restored. Thereby, the edge originally included in the input image can be restored. As a result, a good noise-reduced image can be obtained. Specifically, in the restoring unit, the difference between the input image and the image having a limited bandwidth is calculated. By comparing the difference to the noise amount to be predicted, noise can be distinguished from a degraded component due to the noise reduction processing. Accordingly, a correction signal for compensating for the degraded component can be generated, and synthesized with the image having a limited bandwidth thereby to restore the degraded component.

Moreover, the difference calculating unit may calculate the difference between the input image and the noise-reduced image in each of pixels in the input image and a corresponding one of pixels in the noise-reduced image, the predicted noise obtaining unit may obtain the predicted noise amount in each of the pixels in the input image and each of the corresponding pixels in the noise-reduced image, and the correction signal generating unit may generate the correction signal in each of the pixels in which the absolute value of the difference between the input image and the noise-reduced image exceeds the predicted noise amount.

Thereby, a pixel having image information degraded by the noise reduction processing can be determined thereby to specify the pixel for which the correction signal needs to be generated.

Specifically, the correction signal indicates a difference between the absolute value of the difference between the input image and the noise-reduced image and the predicted noise amount in each of the pixels, and the image synthesizing unit may add or subtract a value of the correction signal with a positive or negative sign, which the difference between the input image and the noise-reduced image has, to or from a pixel value of the pixel corresponding to the correction signal generated in the correction signal generating unit.

Moreover, the predicted noise obtaining unit may obtain the predicted noise amount based on an ISO (International Organization for Standardization) speed of an imaging apparatus used to take the input image, and luminance information included in the input image.

Usually, the predicted noise amount is determined according to the luminance value of the pixel. The noise prediction model changes according to the ISO speed of an imaging apparatus used to take the input image. Accordingly, a proper predicted noise amount can be obtained based on the ISO speed of an imaging apparatus used to take the input image, and the luminance information of the image.

Moreover, the predicted noise obtaining unit may obtain the predicted noise amount based on properties of an image sensor included in an imaging apparatus used to take the input image, and the luminance information included in the input image.

The noise prediction model also changes according to the properties of the image sensor used to take the input image. Accordingly, a proper predicted noise amount can be obtained based on the properties of the image sensor used to take the image and the luminance information of the image.

Moreover, the restoring unit further may include a second band limiting unit that performs bandwidth limitation on the correction signal generated in the correction signal generating unit.

Thereby, the high frequency component included in the correction signal generated in the correction signal generating unit can be reduced, thereby preventing drastic change in a pixel value (each of luminance values of Red, Green, and Blue) in adjacent pixels. As a result, the noise included in an input image can be further reduced.

Moreover, the restoring unit may further include a third band limiting unit that performs bandwidth limitation on the noise-reduced image corrected in the image synthesizing unit.

Thereby, the bandwidth can be limited in the image after correction, and the high frequency component can be limited, leading to a further enhanced noise reduction effect.

Moreover, the restoring unit may further perform the restoration processing on the noise-reduced image corrected in the image synthesizing unit.

Thereby, when the image information lost during the noise reduction processing is restored, the noise-reduced image subjected to the noise reduction processing once is used as a new input image, and repeatedly subjected to the restoration processing by the restoring unit. As a result, the luminance values of the respective pixels approach asymptotically to the true luminance values before noise is included in the input image. Thereby, the predicted noise obtaining unit can obtain the predicted noise amount based on the luminance value closer to the true luminance value. Accordingly, the restoring unit can perform the noise reduction processing more accurately.

Moreover, the first band limiting unit may limit a bandwidth more strongly than the second band limiting unit.

Moreover, the first band limiting unit may limit a bandwidth more strongly than the third band limiting unit.

Moreover, the predicted noise obtaining unit may obtain a larger noise amount as the predicted noise amount as the luminance value indicated by the luminance information is larger.

One aspect of the image processing method according to the present invention includes: reducing noise included in an input image; and performing a restoration processing on a noise-reduced image to restore image information other than the noise, the noise-reduced image being the input image subjected to a noise reduction processing in the first band limitation, and the image information being degraded by the performance of the noise reduction processing, wherein the performing includes: calculating a difference between the input image and the noise-reduced image; obtaining a predicted noise amount to be included in the input image; generating a correction signal for correcting the noise-reduced image and controlling an absolute value of the difference between the input image and the noise-reduced image within a range of the predicted noise amount, and correcting the noise reduced image based on the correction signal.

Overall or specific aspects of these may be implemented as a system, a method, an integrated circuit, a computer program, or a recording medium, or may be implemented as any combination of a system, a method, an integrated circuit, a computer program, and a recording medium.

Hereinafter, embodiments according to the present invention will be described with reference to the drawings.

The embodiments to be described below only show specific examples of the present invention. Numeral values, shapes, components, arrangements, positions, and connection forms of the components, steps, order of the steps, and the like shown in the embodiments below are only examples, and will not limit the present invention. Among the components in the embodiments below, components not described in independent claims expressing the highest concept will be described as arbitrary components.

Embodiment 1

FIG. 1 is a functional block diagram of an image processing device 100 according to Embodiment 1 of the present invention. The image processing device 100 is typically part of an imaging apparatus such as a digital still camera and a video camera. The image processing device 100 may be packaged as software that operates on a personal computer.

The image processing device 100 according to Embodiment 1 of the present invention includes a first band limiting unit 10 and a restoring unit 20.

The first band limiting unit 10 limits the bandwidth in an input image, and limits the high frequency component including noise. Namely, the first band limiting unit 10 reduces the noise included in the input image. As the first band limiting unit 10, use of at least one of a low-pass filter, a Gaussian filter, and a bilateral filter can be thought, for example.

Hereinafter, the noise means random noise such as the so-called light shot noise.

The restoring unit 20 restores the degraded edge component in the image subjected to the noise reduction in the first band limiting unit 10. The restoring unit 20 performs a restoration processing of restoring the image information degraded by performing the noise reduction processing other than the noise. The restoration processing is performed on a noise-reduced image which is an input image subjected to the noise reduction processing in the first band limiting unit 10. The image information other than noise refers to an edge component included in the input image, for example.

More specifically, the restoring unit 20 has a difference calculating unit 21, a correction signal generating unit 22, an image synthesizing unit 23, and a predicted noise obtaining unit 26.

The difference calculating unit 21 calculates the difference between the input image and the image in which the high frequency component is limited in the first band limiting unit 10 (i.e., noise-reduced image). More specifically, the difference calculating unit 21 calculates the difference in each of pixels in the input image and a corresponding one of pixels in the noise-reduced image.

The predicted noise obtaining unit 26 obtains a predicted noise amount to be included in the input image. More specifically, the predicted noise amount is obtained based on the noise information including an ISO speed of an imaging apparatus used to take the input image and properties of an image sensor, and the luminance information of the image. Here, the predicted noise obtaining unit 26 obtains the predicted noise amount in each of the pixels in the input image and each of the corresponding pixels in the noise-reduced image.

The correction signal generating unit 22 generates a correction signal for the degraded edge (hereinafter, referred to as a correction signal) based on the difference between the input image and the noise-reduced image calculated by the difference calculating unit 21 and the predicted noise amount obtained by the predicted noise obtaining unit 26. Specifically, the correction signal generating unit 22 generates the correction signal for correcting the noise-reduced image and controlling an absolute value of the difference between the input image and the noise-reduced image within a range of the predicted noise amount. Here, the correction signal generating unit 22 generates the correction signal for each of the pixels in which the absolute value of the difference between the input image and the noise-reduced image calculated by the difference calculating unit 21 exceeds the predicted noise amount.

Based on the correction signal generated in the correction signal generating unit 22, the image synthesizing unit 23 corrects the noise-reduced image in which the high frequency component is limited in the first band limiting unit 10, and outputs the noise-reduced image after correction.

Figure 2:
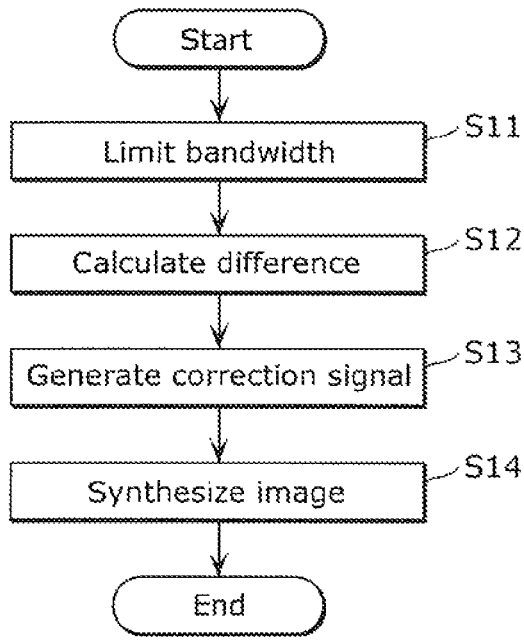
FIG. 2 is a flowchart showing an example of an image processing method according to Embodiment 1 of the present invention.

FIG. 2 is a flowchart showing the processing by the image processing device 100 according to Embodiment 1 of the present invention.

First, in first band limiting unit 10, the bandwidth is limited in the input image (S11). Here, in order to reduce noise, the high frequency component including noise is limited. Namely, among the frequency components included in the input image, the high frequency component is reduced. Thereby, noise is reduced in the input image. In the present embodiment, a method for limiting a high frequency component is not limited. Any method such as an ordinary low-pass filter may be used as long as the method is effective in limitation of the high frequency component.

In the image having the high frequency component limited in the first band limiting unit 10, noise is reduced and the edge component included in the high frequency component is also reduced. For this, the edge is degraded, resulting in a blurred image. Hence, the image processing device 100 according to Embodiment 1 performs the bandwidth limitation processing, and then, restores the degraded edge in the restoring unit 20.

In the difference calculating unit 21, the difference between the input image and the image having a limited bandwidth is calculated (S12).

In the predicted noise obtaining unit 26, the predicted noise amount is obtained based on the noise information obtained from the ISO speed and the properties of the sensor, and the luminance of the image. Here, the predicted noise amount refers to a predicted noise amount serving as a reference on a condition. For example, the predicted noise amount is the maximum noise amount to be expected in a luminance.

Here, obtaining the predicted noise amount as the reference will be described.

Usually, random noise included in an image has a property of depending on the luminance of an image signal. Moreover, the taken image is gained up by the ISO speed of an imaging apparatus used to take the input image. Following this, noise is amplified. Namely, from the noise information such as the properties of the image sensor and the ISO speed of an imaging apparatus used to take the input image, and the luminance of the image signal, the predicted amount of random noise to be included in the image is obtained. Using this property, a relationship between the luminance and the noise amount is measured in advance on a predetermined condition for the respective pixels included in the image taken by the imaging apparatus. Thereby, a noise model for predicting the noise amount can be created.

Figure 3A:
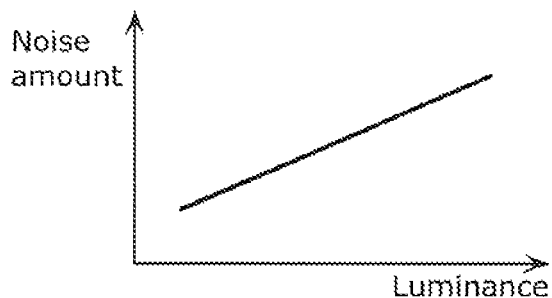
FIG. 3A is a drawing showing an example of a noise model in Embodiments 1 to 6 according to the present invention.

FIG. 3A shows an example of the noise model. FIG. 3 is a graph showing the relationship between the luminance shown in the abscissa and the predicted noise amount shown in the ordinate. As shown in FIG. 3A, the predicted noise obtaining unit 26 obtains a larger amount of noise as the predicted noise amount as the luminance value indicated by the luminance information is larger.

Figure 3B:
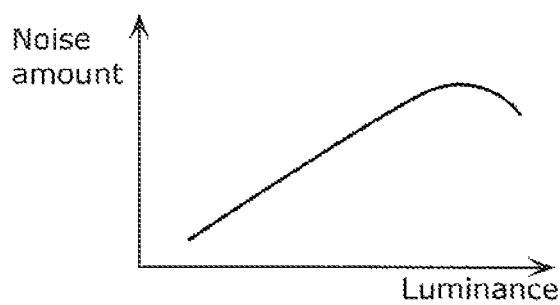
FIG. 3B is a drawing showing another example of a noise model in Embodiments 1 to 6 according to the present invention.

In FIG. 3A, the relationship between the luminance value of the pixel and the predicted noise amount has a linear relationship, but the relationship is not limited to this and depends on the properties of the camera used as the imaging apparatus. For example, another model can be thought in which as the luminance is larger, the predicted noise amount is larger in a non-linear form. Alternatively, as shown in FIG. 3B, a model can be thought in which at a luminance value or less, the predicted noise amount is increased as the luminance is larger; at a luminance value more than the luminance value, the predicted noise amount is constant or reduced.

By referring such a noise model determined in advance, the predicted noise obtaining unit 26 obtains the predicted noise amount from the luminance of the input image.

In the correction signal generating unit 22, the correction signal is generated using the difference between the input image and the image having a limited bandwidth (noise-reduced image) and the predicted noise amount calculated in the predicted noise obtaining unit 26 (S13).

The difference between the input image and the image having a limited bandwidth includes a noise component and a degraded signal in the edge portion of the image that causes blur of the image in the bandwidth limitation processing. The correction signal generating unit 22 distinguishes the noise from the degraded signal in the edge portion of the image for each of the pixels. If it is determined as the degraded signal in the edge portion of the image, the correction signal generating unit 22 generates the corresponding correction signal.

Figure 4:
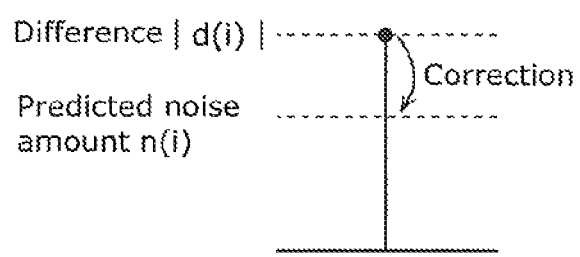
FIG. 4 is a drawing showing an example of a method for calculating a correction signal according to Embodiments 1 to 6 of the present invention.

FIG. 4 is a drawing showing an example of a method for calculating a correction signal according to Embodiment 1 of the present invention.

In FIG. 4, a difference between the input image and the noise-reduced image in a pixel i is defined as $d(i)$, and the predicted noise amount is defined as $n(i)$. In this case, the correction signal generating unit 22 compares the absolute value of $d(i)$ to $n(i)$. When the absolute value of the difference $d(i)$ is greater than the predicted noise amount, it is thought that the luminance value is changed exceeding the range of the predicted noise amount in the pixel i when the first band limiting unit 10 limits the high frequency component. Accordingly, it is determined that the pixel i is a pixel in which the edge component of the image signal is degraded. Then, the correction signal generating unit 22 generates the correction signal for the pixel i in which the absolute value of the difference $d(i)$ is greater than the predicted noise amount.

The correction signal is represented by Expression 1 below:

(Expression 1)

$$c(i)=|d(i)|-n(i) \qquad (1)$$

The correction signal generating unit 22 generates the correction signal for controlling the absolute value of the difference between the input image and the noise-reduced image within the range of the predicted noise amount. Namely, the correction signal indicates a difference between the absolute value of the difference between the input image and the noise-reduced image and the predicted noise amount, and the difference as the correction signal is calculated in each of the pixels.

Next, in the image synthesizing unit 23, according to Expression 2 described later, the correction signal generated in the correction signal generating unit 22 is synthesized with the pixel having the absolute value of the difference between the input image and the noise-reduced image exceeding the predicted noise amount among the pixels in which the high frequency component is limited in the first band limiting unit 10. Thereby, the degraded edge portion is corrected (S14).

In the image subjected to the processing of limiting the high frequency component in the first band limiting unit 10, the luminance value in the pixel i is defined as pre(i), and the signal resulting from the synthesis is defined as res(i), res(i) is calculated by Expression 2:

(Expression 2)

$$res(i)=pre(i)-\text{sign}(d(i)) \times c(i) \qquad (2)$$

Here, sign(d(i)) is a function representing a sign of d(i).

Expression 2 is premised on that the difference between the input image and the noise-reduced image is calculated in the difference calculating unit 21 by subtracting each of the pixel values of the pixels included in the input image from each of the pixel values of the corresponding pixels included in the noise-reduced image. Alternatively, for example, the difference calculating unit 21 may calculate the difference between the input image and the noise-reduced image by subtracting each of the pixel values of the pixels included in the noise-reduced image from each of the pixel values of the corresponding pixels included in the input image. In this case, in Expression 2, pre(i) is added to sign(d(i))×c(i).

Namely, by the image synthesizing unit 23, a value of the correction signal with a positive or negative sign that the difference between the input image and the noise-reduced image calculated by the difference calculating unit 21 has is added to or subtracted from the pixel value of the pixel corresponding to the correction signal generated in the correction signal generating unit 22.

According to such a configuration, when noise reduction is performed on the image, the noise of the input image can be reduced by limitation of the bandwidth, and the edge can be restored using the predicted noise amount serving as the reference. Accordingly, without degrading the image signal in the edge portion, noise reduction can be performed well. Moreover, even when a processing such as restoring of an image is performed after the noise reduction processing, a high-definition image can be obtained without enhancing noise.

In Embodiment 1, when the predicted noise amount is obtained in units of pixels, the predicted noise amount is obtained by referring the noise model based on the luminance of the input image. When the input image includes a large amount of noise, however, the influence of noise may prevent the predicted noise amount from be accurately calculated. In this case, the predicted noise amount may be calculated by referring the noise model based on the luminance of the image on which noise reduction is performed by the first band limiting unit 10. Alternatively, without using the first band limiting unit 10, a new bandwidth limitation processing unit may be provided. The image processing device 100 may reduce the noise included in an input image in the new bandwidth limitation processing unit, and refer the noise model based on the luminance of the pixel included in the image subjected to noise reduction in the new bandwidth limitation processing unit, thereby to obtain the predicted noise amount.

The noise model is typically recorded in advance in a memory or the like included in the imaging apparatus such as a digital still camera in which the image processing device 100 is incorporated. Alternatively, the noise model may be recorded in a database connected to a network. In this case, it is thought that the image processing device 100 obtains the noise model from the database via the network such as the Internet.

Figure 5A:
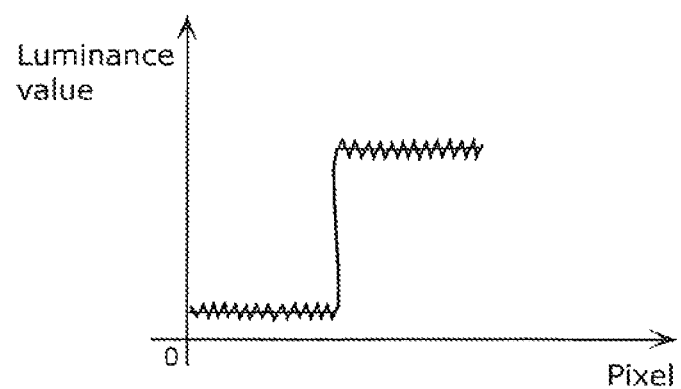
FIG. 5A is a drawing showing noise included in an input image.
Figure 5B:
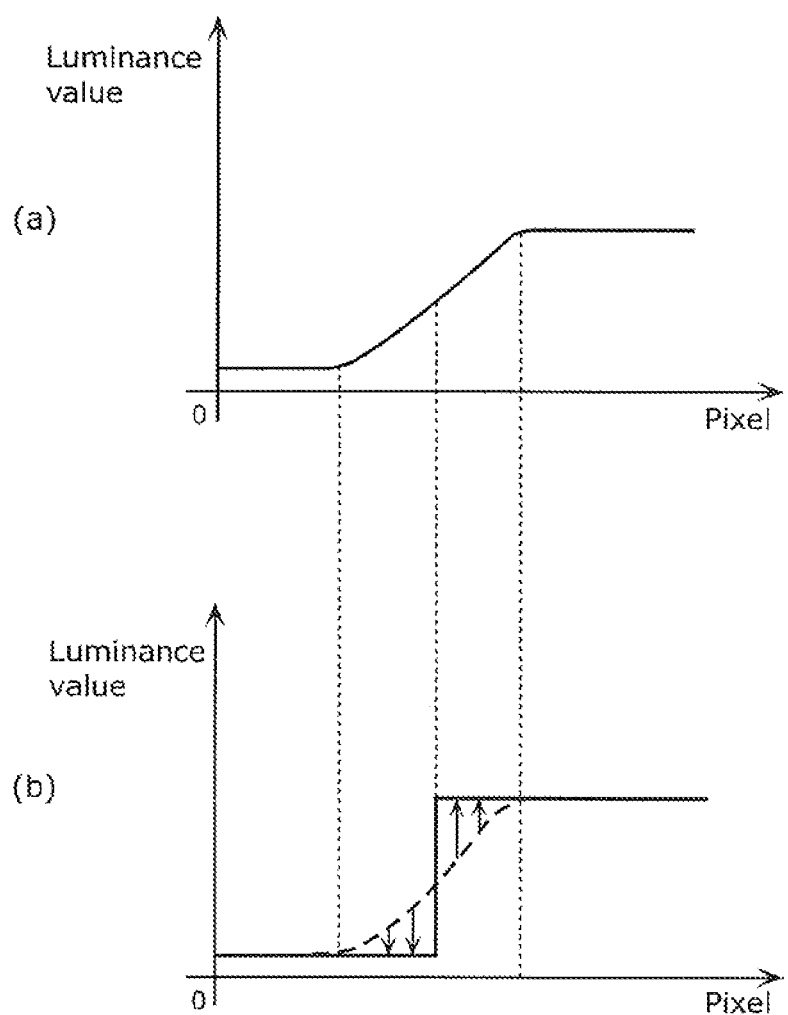
FIG. 5B is a drawing showing a result obtained by performing a noise reduction processing and a restoration processing on a straight line region shown in FIG. 5A.

FIG. 5A and FIG. 5B are conceptual drawings for describing the effect of the image processing device 100 according to the present embodiment. In FIG. 5A and FIG. 5B, the abscissa designates the positions of pixels included in a straight line region set on the image. The ordinate designates the luminance value in the corresponding pixel.

FIG. 5A shows the noise included in the input image. It shows the state where a flat portion in the luminance value has random noise. The portion in which the luminance value sharply changes corresponds to the edge region of the image.

(a) of FIG. 5B shows a result obtained by performing the noise reduction processing by the first band limiting unit 10 on the straight line region shown in FIG. 5A. The random noise is cancelled, and the sharp rise of the luminance value becomes mildly dull. This indicates that the edge region of the image is blurred.

(b) of FIG. 5B shows a result obtained by performing the restoration processing by the restoring unit 20 on the straight line region shown in (a) of FIG. 5B. The rise of the luminance that becomes dull by the noise reduction processing performed by the first band limiting unit 10 is restored. This indicates that the sharpness of the edge region that the input mage originally has can be restored.

As described above, according to the image processing device 100 according to the present embodiment, the noise included in the input image can be canceled in the entire image region, and an influence of an excessive noise reduction processing can be suppressed. Accordingly, the input image can be subjected to the noise reduction processing without impairing the sharpness of the edge portion significantly susceptible to the excessive noise reduction processing.

Embodiment 2

Figure 6:
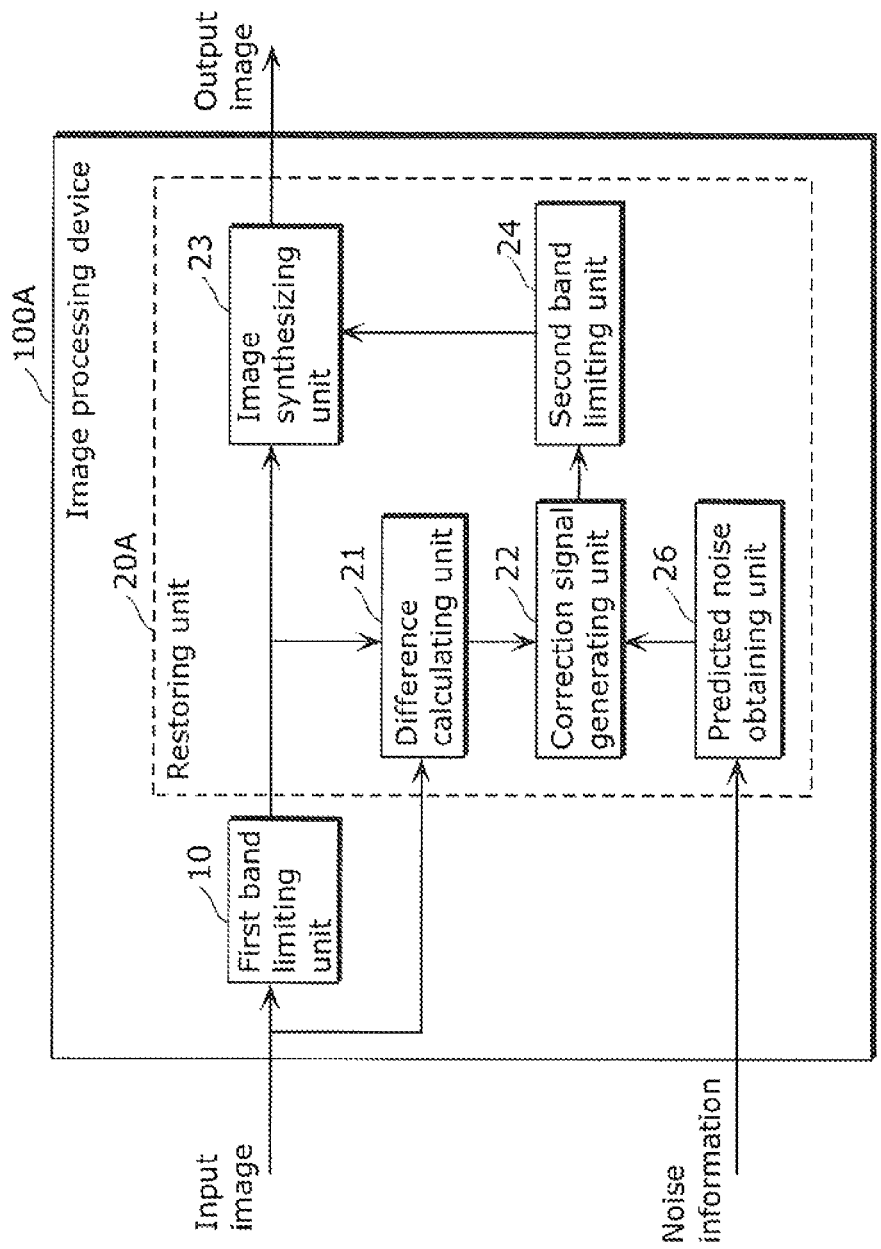
FIG. 6 is a block diagram showing an example of an image processing device according to Embodiment 2 of the present invention.

FIG. 6 is a functional block diagram of an image processing device 100A according to Embodiment 2 of the present invention. In FIG. 6, same referential numerals will be given to same components as those in FIG. 1, and the description will be omitted.

In FIG. 6, a second band limiting unit 24 that the restoring unit 20A has performs bandwidth limitation on the correction signal generated in the correction signal generating unit 22. Specifically, the second band limiting unit 24 performs a smoothing processing on the correction signal.

The correction signal generating unit 22 calculates the correction signal in units of pixels. For this reason, the amount of the correction signal may be largely different among the pixels. This may cause a large difference among the luminance values of the pixels included in the noise-reduced image after correction in the image synthesizing unit 23. The difference in the luminance value may appear as new noise and be seen in an output image. In the second band limiting unit 24, the correction signal generated in the correction signal generating unit is subjected to bandwidth limitation thereby to suppress drastic change in the luminance among adjacent pixels. According to this configuration, the image processing device 100A can provide a further noise reduction effect while suppressing production of new noise.

In Embodiment 2, the bandwidth limitation processing in the second band limiting unit 24 can be implemented by any processing having an effect of limiting the high frequency component. For example, any method such as a low-pass filter or an edge keeping filter such as a bilateral filter may be used. Preferably, the first band limiting unit 10 limits the bandwidth more strongly than the second band limiting unit 24. The restoration processing is performed by the restoring unit 20A after the band limitation by the first band limiting unit 10. The first band limiting unit 10 can give higher priority to the noise reduction effect rather than the influence given to the edge. Meanwhile, the second band limiting unit 24 is preferably an edge keeping filter. No processing of restoring the edge portion is performed after the processing by the second band limiting unit 24. For this reason, the second band limiting unit 24 desirably performs a processing that can keep the pixel information of the edge portion as much as possible.

Embodiment 3

Figure 7:
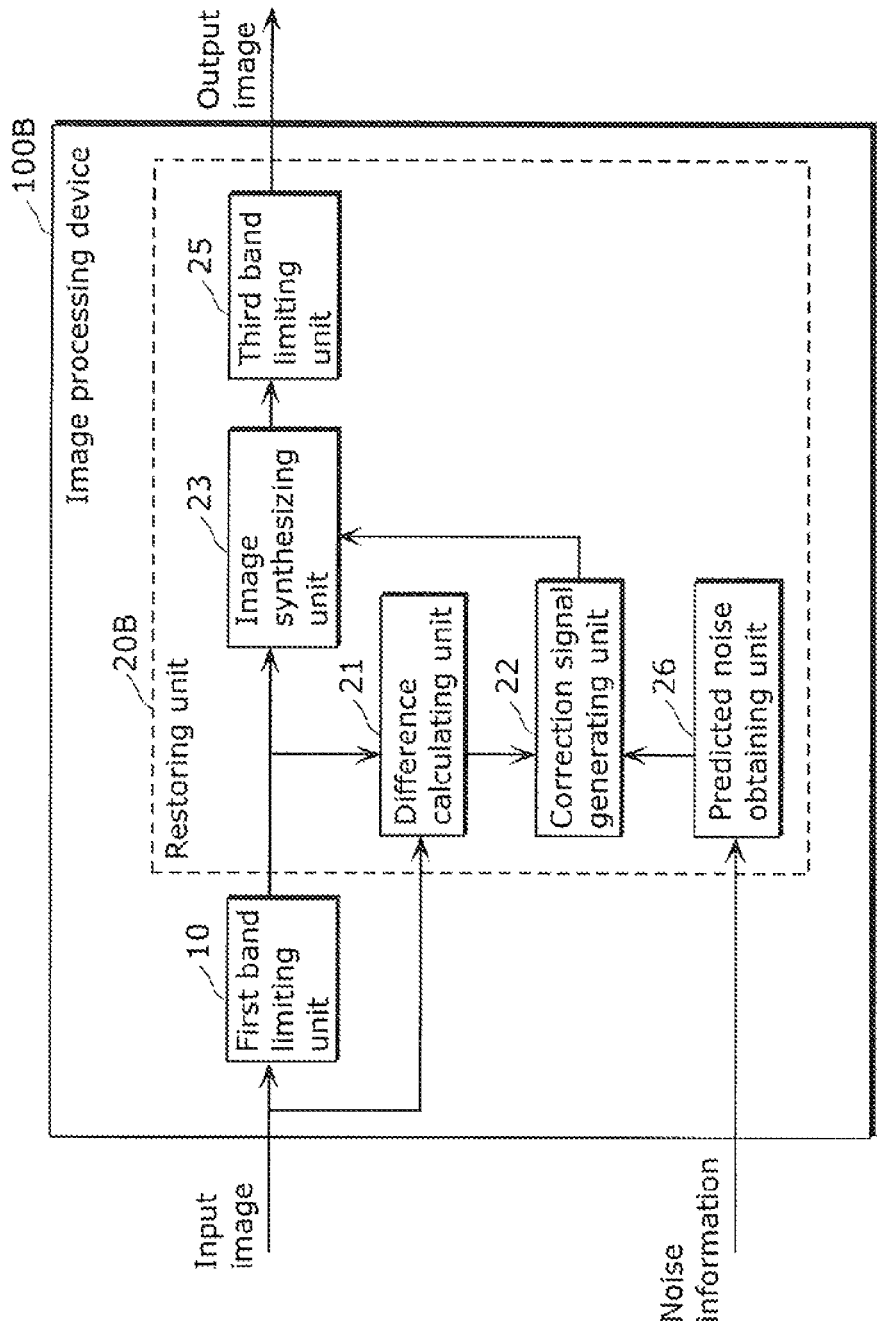
FIG. 7 is a block diagram showing an example of an image processing device according to Embodiment 3 of the present invention.

FIG. 7 is a functional block diagram of an image processing device 100B according to Embodiment 3 of the present invention. In FIG. 7, same referential numerals will be given to same components as those in FIG. 1, and the description will be omitted.

In FIG. 7, a third band limiting unit 25 that the restoring unit 20B has further performs bandwidth limitation on the noise-reduced image corrected by the image synthesizing unit 23. The third band limiting unit 25 performs high frequency bandwidth limitation on an output from the image synthesizing unit 23. Thereby, the remaining noise included in the corrected image can be reduced. Accordingly, the image processing device 100B can output an output image with higher quality.

In the present embodiment, the bandwidth limitation processing in the third band limiting unit 25 can be implemented by any processing having an effect of limiting the high frequency component. For example, any method such as a low-pass filter or an edge keeping filter such as a bilateral filter may be used. Preferably, the first band limiting unit 10 limits the bandwidth more strongly than the third band limiting unit 25. The restoration processing is performed by the restoring unit 20B after the band limitation by the first band limiting unit 10. The first band limiting unit 10 can give higher priority to the noise reduction effect rather than the influence given to the edge. Meanwhile, the third band limiting unit 25 is preferably an edge keeping filter. No processing of restoring the edge portion is performed after the processing by the third band limiting unit 25. For this reason, the third band limiting unit 25 desirably performs a processing that can keep the pixel information of the edge portion as much as possible.

Embodiment 4

Figure 8:
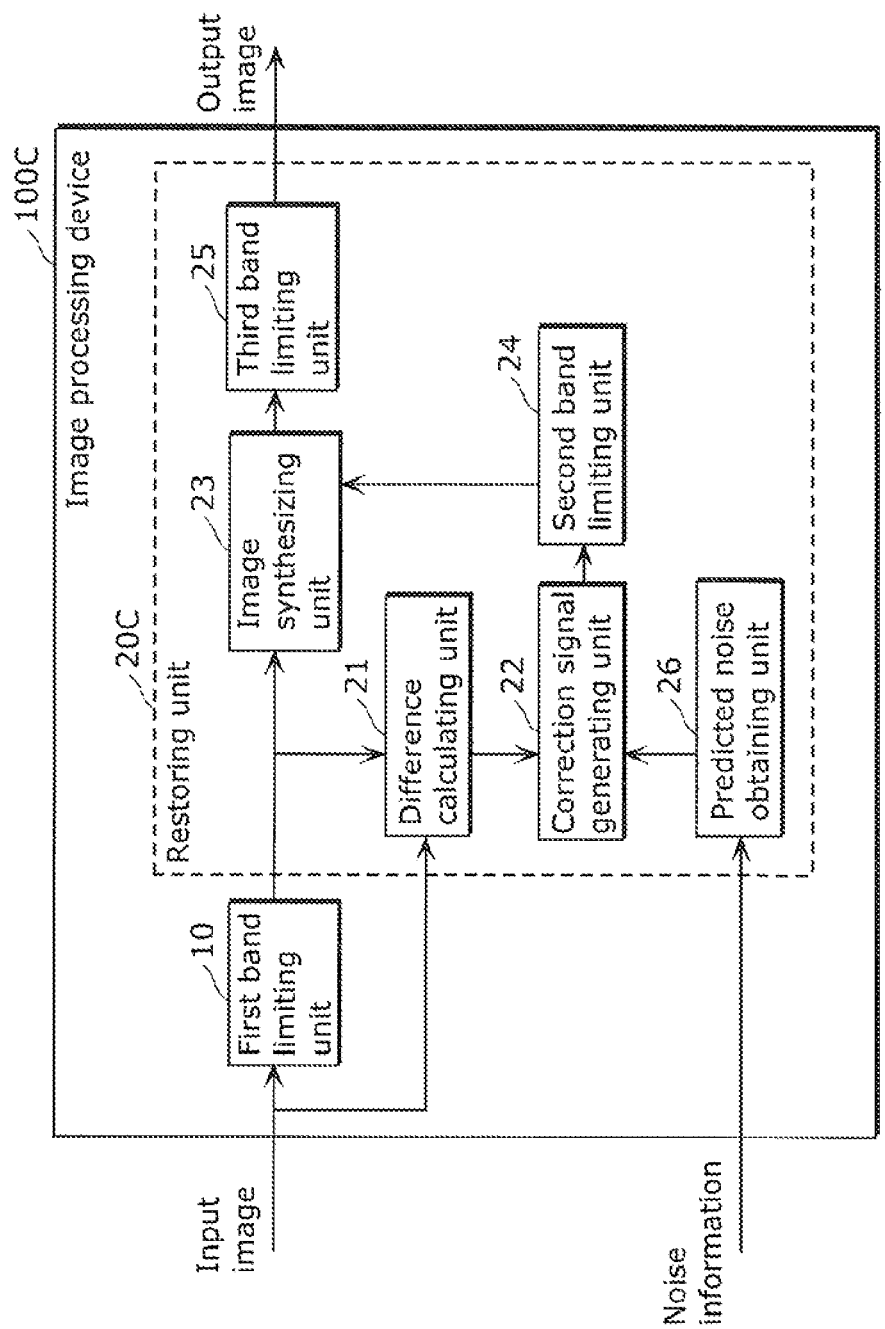
FIG. 8 is a block diagram showing an example of an image processing device according to Embodiment 4 of the present invention.

FIG. 8 is a functional block diagram of an image processing device 100C according to Embodiment 4 of the present invention. In FIG. 8, same referential numerals will be given to same components as those in FIG. 6 and FIG. 7, and the description will be omitted.

In FIG. 8, by using both of the second band limiting unit 24 and the third band limiting unit 25 that the restoring unit 20C has, the noise reduction effect can be further improved. In addition, drastic change can be suppressed among adjacent pixels, providing high quality of an image.

First, the second band limiting unit 24 performs bandwidth limitation on the correction signal calculated in the correction signal generating unit 22.

The correction signal generating unit 22 calculates the correction signal in units of pixels. For this reason, the amount of the correction signal may be largely different among the pixels. This may cause a large difference among the luminance values of the pixels included in the noise-reduced image after correction of the image synthesizing unit 23. The difference in the luminance value may appear as new noise and be seen in an output image. In the second band limiting unit 24, the correction signal generated in the correction signal generating unit is subjected to bandwidth limitation thereby to suppress drastic change in the luminance among adjacent pixels. According to this configuration, the image processing device 100C can provide a further noise reduction effect while suppressing production of new noise.

Next, the third band limiting unit 25 further performs bandwidth limitation on the image signal synthesized in the image synthesizing unit 23. The third band limiting unit 25 performs high frequency bandwidth limitation on the output from the image synthesizing unit 23. Thereby, the remaining noise included in the corrected image can be reduced. Accordingly, the image processing device 100C can output an output image with higher quality.

In Embodiment 4, the second band limiting unit 24 and the third band limiting unit 25 can be implemented by any processing having an effect of limiting the high frequency component similarly to Embodiment 2 and Embodiment 3. For example, any method such as a low-pass filter or an edge keeping filter such as a bilateral filter may be used. Preferably, the first band limiting unit 10 limits the bandwidth more strongly than the second band limiting unit 24 and the third band limiting unit 25. The restoration processing is performed by the restoring unit 20C after the band limitation by the first band limiting unit 10. The first band limiting unit 10 can give higher priority to the noise reduction effect rather than the influence given to the edge.

Embodiment 5

Figure 9:
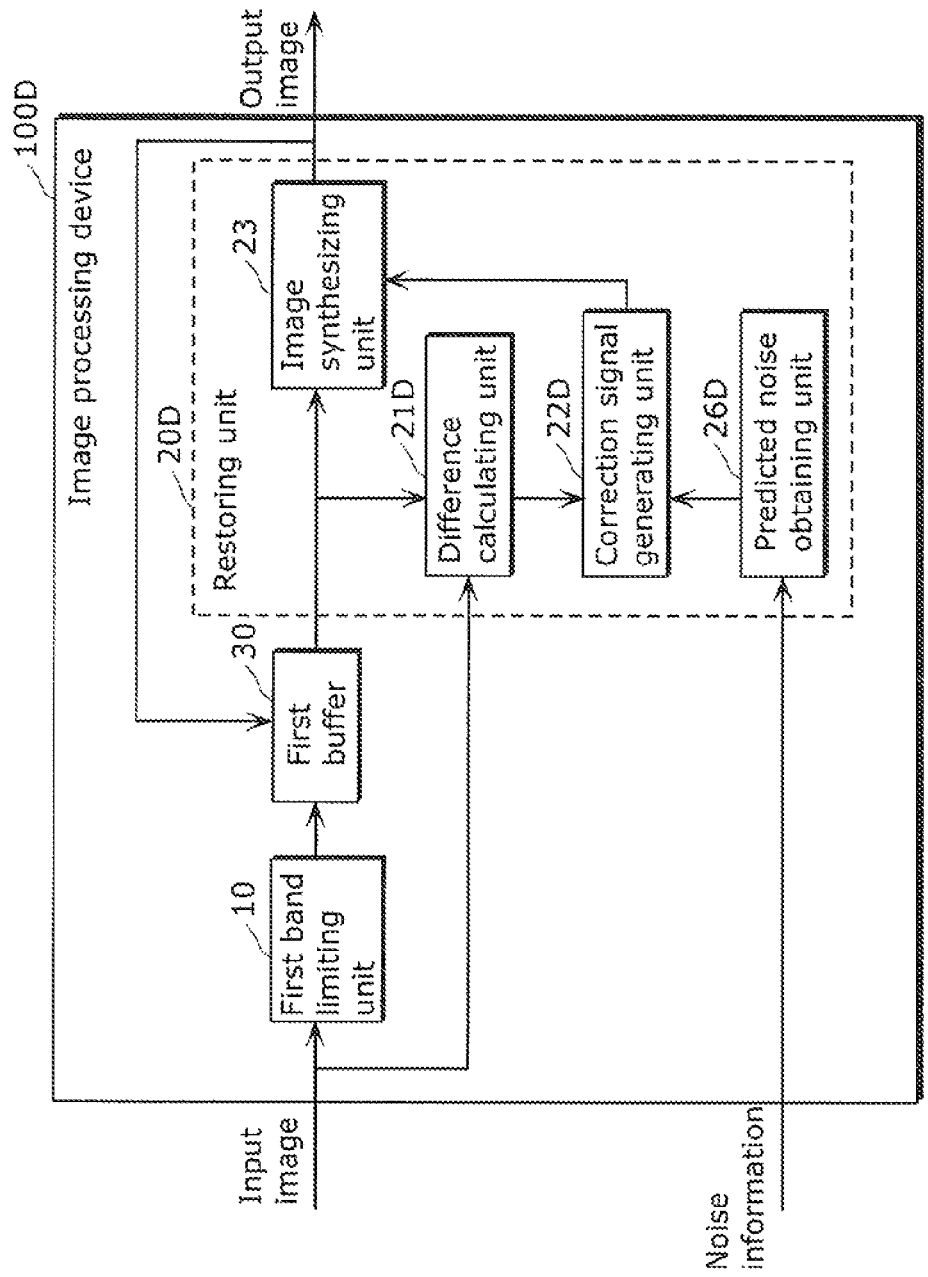
FIG. 9 is a block diagram showing an image processing device according to Embodiment 5 of the present invention.

FIG. 9 is a functional block diagram of an image processing device 100D according to Embodiment 5 of the present invention. In FIG. 9, same referential numerals will be given to same components as those in FIG. 1, and the description will be omitted. A restoring unit 20D included in the image processing device 100D performs an additional restoration processing on the noise-reduced image corrected in the image synthesizing unit 23. Hereinafter, the processing will be described more in detail.

The image processing device 100D according to Embodiment 5 of the present invention includes the first band limiting unit 10, a first buffer 30, and a restoring unit 20D.

The first buffer 30 is a buffer for temporarily storing the output image from the image synthesizing unit 23.

The restoring unit 20D uses the input image and the output image output from the image synthesizing unit 23 and temporarily stored in the first buffer 30, and performs the restoration processing several times repeatedly.

For example, the predicted noise obtaining unit 26 included in the image processing device 100 according to Embodiment 1 obtains the predicted noise amount based on the luminance information included in the input image. The input image, however, includes noise originally. Accordingly, in Embodiment 1, the correction signal generating unit 22 generates the correction signal based on the noise amount predicted from the luminance including the noise.

Meanwhile, in the present embodiment, the restoring unit 20D repeats the restoration processing on the output from the restoring unit 20D recursively. Accordingly, in the second loop processing, for example, the correction signal generating unit 22D can generate the correction signal based on the noise amount predicted from the luminance of the image in which noise is more reduced.

In Embodiment 5 according to the present invention, when the loop processing is performed, the restoration processing in the restoring unit 20D may be adjusted to be weak, and the degraded edge component may be gradually restored in each loop. Thereby, the edge can be restored with high precision.

In Embodiment 5 according to the present invention, in the first loop, the difference calculating unit 21D calculates the difference between the input image and the image in which the high frequency component is limited in the first band limiting unit 10. The predicted noise obtaining unit 26D obtains the predicted noise amount from the luminance value of each of the pixels included in the input image and the noise information such as the ISO speed or properties of the sensor.

Meanwhile, in the second loop or later, the difference calculating unit 21D calculates the difference between the original input image and the latest noise-reduced image corrected, output from the image synthesizing unit 23, and stored in the first buffer 30. Moreover, the predicted noise obtaining unit 26D obtains the predicted noise amount from the luminance value of each of the pixels included in the noise-reduced image corrected and stored in the first buffer 30, and the noise information.

Then, the correction signal generating unit 22D generates the correction signal by substituting the calculated difference and the predicted noise amount serving as the reference into Expression 1 described above.

In Embodiment 5 according to the present invention, the correction signal generating unit 22 may limit the correction amount for each processing loop, and control to correct the image in one loop at a correction amount not exceeding the limitation value.

More specifically, when the correction signal is calculated and an incorrect correction signal is calculated due to an influence of noise or the like, image quality may be reduced resultantly. To avoid this, in Embodiment 5 according to the present invention, production of an error may be suppressed by limiting the correction amount in one loop. The correction signal is represented by Expression 3 using a coefficient k(l) of the loop, wherein l is a loop number, and k(l) is a value of a real number of not less than 0 and not more than 1.

(Expression 3)

$$c_1(i) = k(l) \times (|d(i)| - n(i)) \quad 3)$$

Thereby, in the image output from the image synthesizing unit 23, the edge is corrected gradually in each loop, and degradation of the edge is reduced. Thereby, the correction signal generating unit 22 can calculate the predicted noise amount more accurately using the image whose edge is corrected. For this reason, the noise included in a difference image can be distinguished from the degraded signal in the edge portion of the image more accurately, and the correction signal can be generated with high precision.

According to such a configuration, the output from the image synthesizing unit 23 is fed back to the first buffer 30, and repeatedly subjected to the restoration processing in the restoring unit 20. Thereby, the degraded edge component can be restored with high precision. Accordingly, finally, degradation of the edge can be suppressed while noise is reduced, and a high-definition image can be obtained.

Embodiment 6

Figure 10:
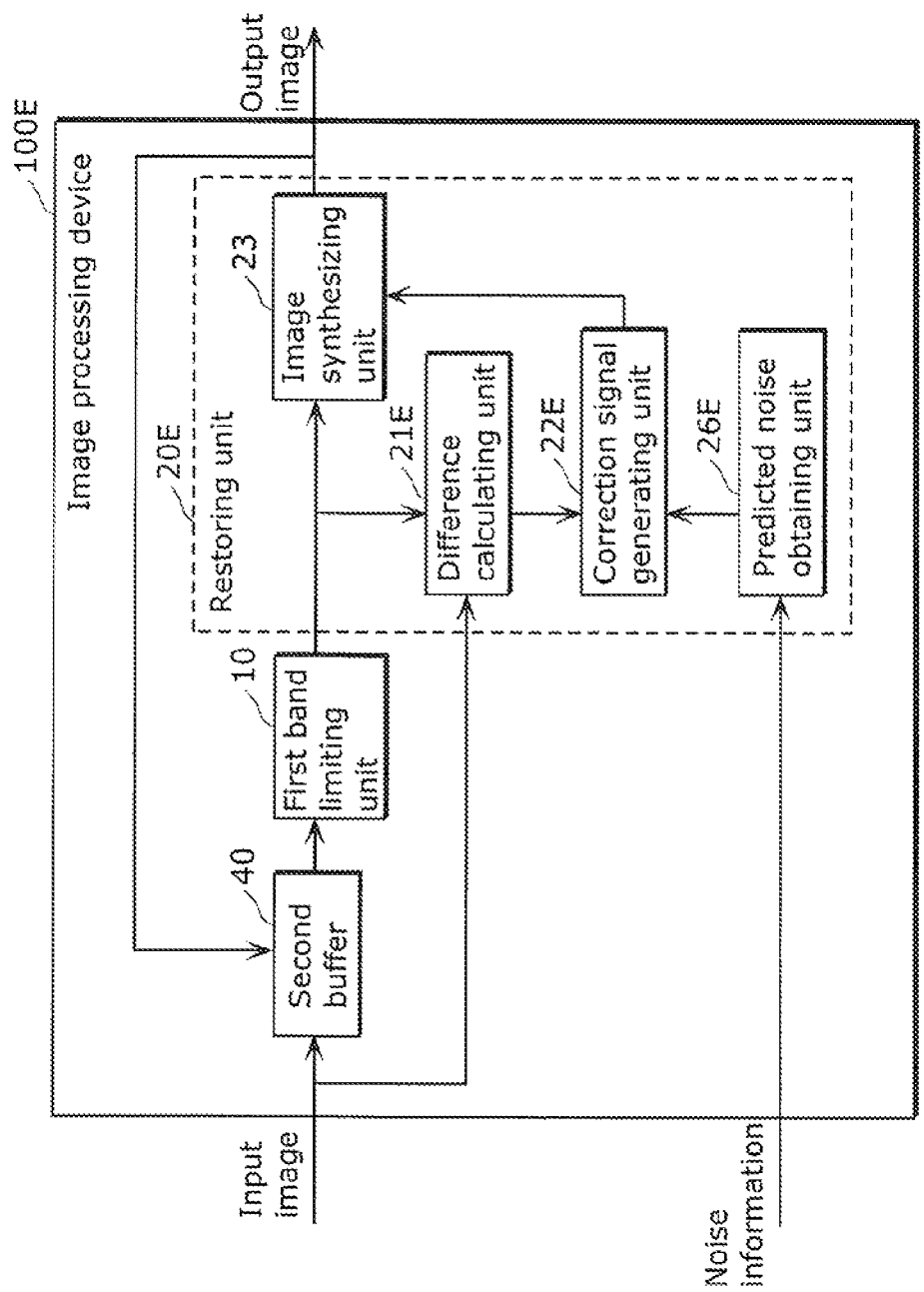
FIG. 10 is a block diagram showing an image processing device according to Embodiment 6 of the present invention.

FIG. 10 is a functional block diagram of an image processing device 100E according to Embodiment 6 of the present invention. In FIG. 10, same referential numerals will be given to same components as those in FIG. 1, and the description will be omitted.

The image processing device 100E according to Embodiment 6 of the present invention includes the first band limiting unit 10, a restoring unit 20E, and a second buffer 40.

The second buffer 40 is a buffer for temporarily storing the output image from the image synthesizing unit 23.

As a loop processing, the image processing device 100E performs the bandwidth limitation processing performed in the first band limiting unit 10 and the restoration processing performed in the restoring unit 20E several times repeatedly.

The image processing device 100E according to Embodiment 6 of the present invention uses a second buffer 40 instead of the first buffer 30 according to Embodiment 5. Other components are the same as those in Embodiment 5, and the description will be omitted.

According to such a configuration, the image processing device 100E feeds the noise-reduced image, which is corrected and output from the image synthesizing unit 23, back to the second buffer 40. Subsequently, the image again subjected to the bandwidth limitation by the first band limiting unit 10 is further subjected to the restoration processing in the restoring unit 20E. More specifically, the difference calculating unit 21E calculates the difference between the input image and the noise-reduced image subjected to the noise reduction processing by the first band limiting unit 10. For the first time, the predicted noise obtaining unit 26E obtains the predicted noise amount based on the luminance value of each of the pixels included in the input image. For the second time or later, the predicted noise obtaining unit 26E obtains the predicted noise amount based on the luminance value of each of the pixels included in the noise-reduced image. The correction signal generating unit 22E calculates the correction signal from the output obtained from the difference calculating unit 21E and the output obtained from the predicted noise obtaining unit 26E.

By repeating the feedback processing above, the image processing device 100E can restore the edge with high precision. As a result, finally, degradation of the edge can be suppressed while the noise is reduced, and a high-definition image can be obtained.

Figure 11:
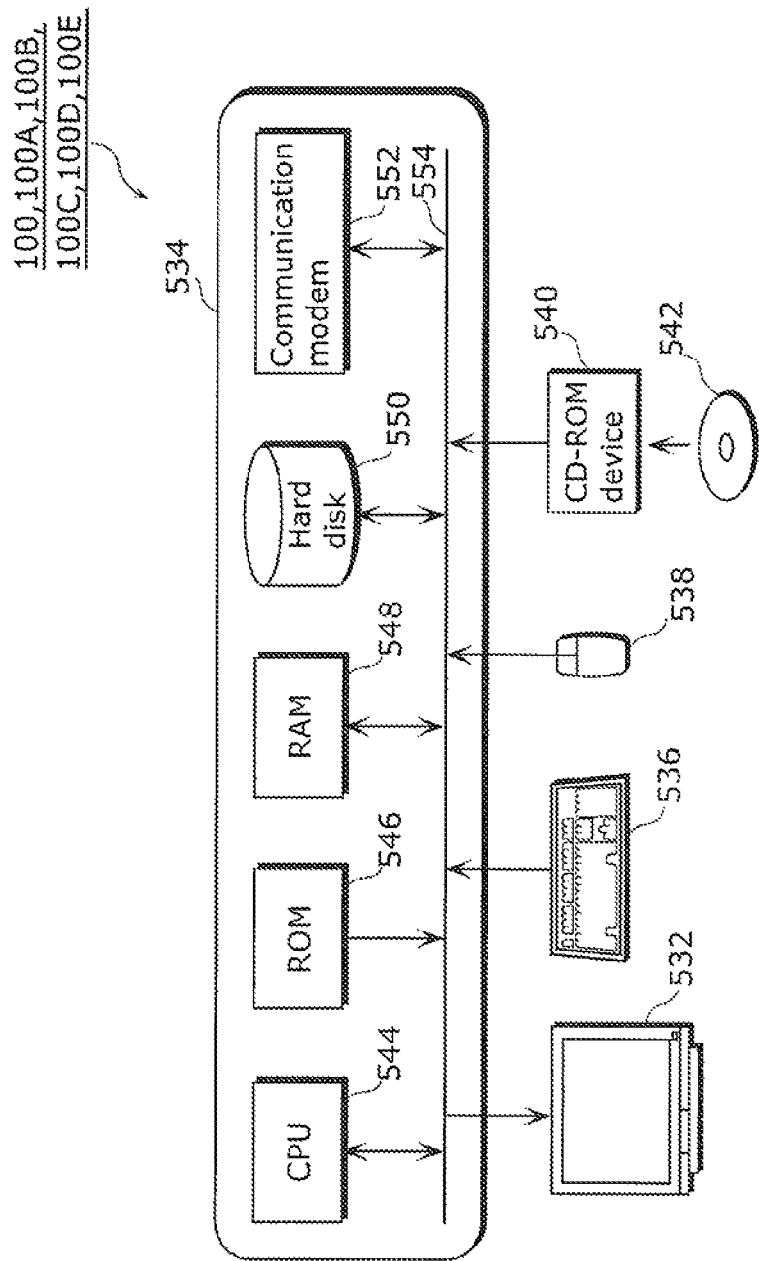
FIG. 11 is a block diagram showing a hardware configuration of a computer system for implementing the image processing devices according to Embodiments 1 to 6 of the present invention.

The image processing devices described in Embodiments 1 to 6 can also be implemented by a computer. FIG. 11 is a block diagram showing a hardware configuration of a computer system that implements the image processing devices 100, 100A, 100B, 100C, 100D, and 100E. Hereinafter, the image processing device 100, 100A, 100B, 100C, 100D, and 100E are referred to as an image processing device 100 collectively.

The image processing device 100 includes a computer 534, a keyboard 536 and mouse 538 for giving an instruction to the computer 534, a display 532 for displaying information such as an arithmetic result of the computer 534, a Compact Disc-Read Only Memory (CD-ROM) device 540 for reading a program executed by the computer 534, and a communication modem (not shown).

The program is a processing performed by the image processing device 100. The program is stored in a computer-readable medium, i.e., the CD-ROM 542, and read by the CD-ROM device 540. Alternatively, the program is read by the communication modem 552 via a computer network.

The computer 534 includes a Central Processing Unit (CPU) 544, a Read Only Memory (ROM) 546, a Random Access Memory (RAM) 548, a hard disk 550, a communication modem 552, and a bus 554.

The CPU 544 executes the program read via the CD-ROM device 540 or the communication modem 552. The ROM 546 stores a program and data needed for operation of the computer 534. The RAM 548 stores data such as parameters when the program is executed. The hard disk 550 stores a program and data. The communication modem 552 communicates with other computer via the computer network. The CPU 544, the ROM 546, the RAM 548, the hard disk 550, the communication modem 552, the display 532, the keyboard 536, the mouse 538, and the CD-ROM device 540 are connected to each other via the bus 554.

Further, part or all of components that form each of the devices may be composed of a single system Large Scale Integrated Circuit (LSI). The system LSI is an ultra multifunctional LSI produced by integrating a plurality of component units on a single chip. Specifically, the system LSI is a computer system including a microprocessor, a ROM, and a RAM. The RAM stores a computer program. The system LSI attains the function when a microprocessor operates according to the computer program.

Alternatively, part or all of components that form each of the devices may be composed of an IC card or a single module that can be attached to and detached from each of the devices. The IC card or module is a computer system including a microprocessor, a ROM, and a RAM. The IC card or module may include the ultra multifunctional LSI. The IC card or module attains the function when the microprocessor operates according to the computer program. The IC card or the module may have tamper proofness.

Alternatively, the present invention may be the method described above. Alternatively, the present invention may be a computer program for causing a computer to perform these methods. Alternatively, the present invention may be digital signals of a computer program.

Further, the present invention may be the computer program or digital signals stored in a computer-readable recording medium, such as a flexible disk, a hard disk, a CD-ROM, a MO, a DVD, a DVD-ROM, a DVD-RAM, a BD (Blu-ray Disc (registered trademark)), a USB memory, and a memory card such as an SD card, and a semiconductor memory. Alternatively, the present invention may be the digital signals recorded in these recording media.

Moreover, the present invention may be the computer program or digital signals transmitted via an electric communication line, a wireless or wired communication line, a network such as the Internet, or a data broadcasting.

The present invention may be a computer system including a microprocessor and a memory, in which the memory stores the computer program, and the microprocessor operates according to the computer program.

Alternatively, the present invention may be implemented by an independent other computer system by storing the program or the digital signals in a recording medium and transporting the recording medium or by transporting the program or the digital signals via the network or the like.

Further, the present invention may be combinations of the embodiments and modifications thereof.

The embodiments disclosed herein are only an example in all respects, and should not be construed to limit the present invention. It is intended that the scope of the present invention is specified by the scope of the claims but not by the description above, and meaning equivalent to the scope of claims and all modifications within the scope are included.

INDUSTRIAL APPLICABILITY

The present invention can be applied to an image processing device and the like. Particularly, the present invention can be applied to an image processing device for reducing noise of an image or the like.

REFERENCE SIGNS LIST

10 First band limiting unit
20, 20A, 20B, 20C, 20D, 20E Restoring unit
21, 21D, 21E Difference calculating unit
22, 22D, 22E Correction signal generating unit
23 Image synthesizing unit
24 Second band limiting unit
25 Third band limiting unit
26, 26D, 26E Predicted noise obtaining unit
30 First buffer
40 Second buffer
100, 100A, 100B, 100C, 100D, 100E Image processing device
532 Display
534 Computer
536 Keyboard
538 Mouse
540 CD-ROM device
542 CD-ROM
544 CPU
546 ROM
548 RAM
550 Hard disk
552 Communication modem
554 Bus

The invention claimed is:

1. An image processing device comprising:
a first band limiting unit configured to reduce noise included in an input image; and
a restoring unit configured to perform a restoration processing on a noise-reduced image to restore image information other than the noise, the noise-reduced image being the input image subjected to a noise reduction processing in the first band limiting unit, and the image information being degraded by the performance of the noise reduction processing,
wherein the restoring unit includes:
a difference calculating unit configured to calculate a difference between the input image and the noise-reduced image;
a predicted noise obtaining unit configured to obtain a predicted noise amount to be included in the input image;
a correction signal generating unit configured to generate a correction signal for correcting the noise-reduced image and controlling an absolute value of the difference between the input image and the noise-reduced image within a range of the predicted noise amount; and
an image synthesizing unit configured to correct the noise-reduced image based on the correction signal.

2. The image processing device according to claim 1,
wherein the difference calculating unit is configured to calculate the difference between the input image and the noise-reduced image in each of pixels in the input image and a corresponding one of pixels in the noise-reduced image,
the predicted noise obtaining unit is configured to obtain the predicted noise amount in each of the pixels in the input image and each of the corresponding pixels in the noise-reduced image, and
the correction signal generating unit is configured to generate the correction signal in each of the pixels in which the absolute value of the difference between the input image and the noise-reduced image exceeds the predicted noise amount.

3. The image processing device according to claim 2,
wherein the correction signal indicates a difference between the absolute value of the difference between the input image and the noise-reduced image and the predicted noise amount in each of the pixels, and
the image synthesizing unit is configured to add or subtract a value of the correction signal with a positive or negative sign, which the difference between the input image and the noise-reduced image has, to or from a pixel value of the pixel corresponding to the correction signal generated in the correction signal generating unit.

4. The image processing device according to claim 1, wherein the predicted noise obtaining unit is configured to obtain the predicted noise amount based on an ISO speed of an imaging apparatus used to take the input image, and luminance information included in the input image.

5. The image processing device according to claim 4, wherein the predicted noise obtaining unit is configured to obtain a larger noise amount as the predicted noise amount as the luminance value indicated by the luminance information is larger.

6. The image processing device according to claim 1, wherein the predicted noise obtaining unit is configured to obtain the predicted noise amount based on properties of an image sensor included in an imaging apparatus used to take the input image, and the luminance information included in the input image.

7. The image processing device according to claim 1, wherein the restoring unit further includes a second band limiting unit configured to perform bandwidth limitation on the correction signal generated in the correction signal generating unit.

8. The image processing device according to claim 7, wherein the first band limiting unit is configured to limit a bandwidth more strongly than the second band limiting unit.

9. The image processing device according to claim 1, wherein the restoring unit further includes a third band limiting unit configured to perform bandwidth limitation on the noise-reduced image corrected in the image synthesizing unit.

10. The image processing device according to claim 9, wherein the first band limiting unit is configured to limit a bandwidth more strongly than the third band limiting unit.

11. The image processing device according to claim 1, wherein the restoring unit is configured to further perform the restoration processing on the noise-reduced image corrected in the image synthesizing unit.

12. An image processing method comprising:
reducing noise included in an input image; and
performing a restoration processing on a noise-reduced image to restore image information other than the noise, the noise-reduced image being the input image subjected to a noise reduction processing in the first band limitation, and the image information being degraded by the performance of the noise reduction processing,
wherein the performing includes:
calculating a difference between the input image and the noise-reduced image;
obtaining a predicted noise amount to be included in the input image;
generating a correction signal for correcting the noise-reduced image and controlling an absolute value of the difference between the input image and the noise-reduced image within a range of the predicted noise amount, and
correcting the noise-reduced image based on the correction signal.

13. A non-transitory computer-readable recording medium on which a program is recorded, the program causing a computer to execute the method according to claim 12.

14. An integrated circuit that performs the image processing method according to claim 12.

* * * * *